(12) United States Patent
Ohuchi

(10) Patent No.: US 9,274,759 B2
(45) Date of Patent: Mar. 1, 2016

(54) MODULE MANAGEMENT APPARATUS, MODULE MANAGEMENT SYSTEM AND MODULE MANAGEMENT METHOD

(71) Applicant: NEC Corporation, Minato-ku, Tokyo (JP)

(72) Inventor: Masayoshi Ohuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 92 days.

(21) Appl. No.: 14/028,662

(22) Filed: Sep. 17, 2013

(65) Prior Publication Data

US 2014/0082589 A1 Mar. 20, 2014

(30) Foreign Application Priority Data

Sep. 20, 2012 (JP) ................................. 2012-206416

(51) Int. Cl.
*G06F 9/44* (2006.01)

(52) U.S. Cl.
CPC . *G06F 8/315* (2013.01); *G06F 8/71* (2013.01)

(58) Field of Classification Search
None
See application file for complete search history.

(56) References Cited

U.S. PATENT DOCUMENTS

| | | | | |
|---|---|---|---|---|
| 5,339,424 | A * | 8/1994 | Fushimi | G06F 8/54 717/145 |
| 5,499,357 | A * | 3/1996 | Sonty et al. | 710/104 |
| 5,519,862 | A * | 5/1996 | Schaeffer | G06F 8/24 717/110 |
| 6,052,691 | A * | 4/2000 | Ardoin | G06F 17/30371 |
| 6,442,748 | B1 * | 8/2002 | Bowman-Amuah | 717/108 |
| 6,564,369 | B1 * | 5/2003 | Hove | G06F 8/71 713/1 |
| 6,601,234 | B1 * | 7/2003 | Bowman-Amuah | 717/108 |
| 7,281,246 | B1 * | 10/2007 | Rapakko | G06F 9/445 710/302 |
| 7,676,788 | B1 * | 3/2010 | Ousterhout | G06F 8/71 709/226 |
| 7,882,501 | B1 * | 2/2011 | Carlson | G06F 8/67 709/203 |
| 8,015,450 | B1 * | 9/2011 | Cooley | G06F 9/44521 714/38.1 |
| 8,065,660 | B1 * | 11/2011 | Tanner et al. | 717/121 |
| 2005/0155031 | A1 * | 7/2005 | Wang | G06F 9/44505 717/170 |
| 2006/0161898 | A1 * | 7/2006 | Bauman et al. | 717/127 |
| 2006/0206890 | A1 * | 9/2006 | Shenfield et al. | 717/174 |
| 2006/0248121 | A1 * | 11/2006 | Cacenco et al. | 707/200 |
| 2008/0209393 | A1 * | 8/2008 | Evensen | G06F 9/44521 717/108 |
| 2008/0301662 | A1 * | 12/2008 | Jurkiewicz et al. | 717/170 |
| 2009/0083705 | A1 * | 3/2009 | Phillips et al. | 717/113 |
| 2009/0183150 | A1 * | 7/2009 | Felts | 717/173 |
| 2009/0276755 | A1 * | 11/2009 | Beltowski et al. | 717/118 |
| 2010/0153909 | A1 * | 6/2010 | Batey et al. | 717/104 |
| 2011/0185340 | A1 * | 7/2011 | Trent et al. | 717/104 |
| 2011/0296254 | A1 * | 12/2011 | Kemper | 714/49 |
| 2013/0232469 | A1 * | 9/2013 | Agarwal | 717/121 |
| 2014/0007051 | A1 * | 1/2014 | Ritter et al. | 717/121 |

FOREIGN PATENT DOCUMENTS

JP 2012-093979 A 5/2012

* cited by examiner

*Primary Examiner* — Tuan Q. Dam
*Assistant Examiner* — Zheng Wei

(57) ABSTRACT

There is provided a module management apparatus, that coordinates, in a time of start of a module management infrastructure carrying out integrated management of: a bundle having a module formed by a program described by an object oriented language and definition information including an attribute of the module; and a module group including a plurality of pieces of the bundle, when the bundle is loaded from a folder, and, if the definition information collides between different bundles, a reference relationship of the bundle by changing the definition information dynamically.

9 Claims, 16 Drawing Sheets

Fig. 5

50 BUNDLE INFORMATION TABLE

| SYMBOLIC NAME | VERSION | DEPENDENT BUNDLE | DEPENDED BUNDLE | FILE NAME |
|---|---|---|---|---|
| a001 | 1.0 | | sname | a001-1.0 |
| sname | 1.0 | a001:1.0 | | a002-1.0 |
| b001 | 1.2 | | sname | b001-1.2 |
| sname | 1.0 | | | b002 |
| | | | | |

Fig. 6

60 SYMBOLIC NAME CHANGE MANAGEMENT TABLE

| FILE PATH OF BUNDLE | SYMBOLIC NAME (BEFORE CHANGE) | SYMBOLIC NAME (AFTER CHANGE) |
|---|---|---|
| /individuals/A/a001 | a001 | Aa001 |
| /individuals/A/a002 | sname | Asname |
| /individuals/A/b001 | b001 | Bb001 |
| /individuals/A/b002 | sname | Bsname |
| | | |
| | | |

MODULE MANAGEMENT APPARATUS, MODULE MANAGEMENT SYSTEM AND MODULE MANAGEMENT METHOD

This application is based upon and claims the benefit of priority from Japanese Patent Application No. 2012-206416, filed on Sep. 20, 2012, the disclosure of which is incorporated herein in its entirety by reference.

TECHNICAL FIELD

The present invention relates to a module management apparatus, a module management system and a module management method which make collision of definition information be avoided in a module management infrastructure carrying out integrated management of program modules described using an object oriented language.

BACKGROUND ART

In an object oriented language having a class loading mechanism of a delegation model represented by Java (a registered trademark), a module is classified by a fully-qualified class name made by combining a class with a package name. As a result, even for classes having a same name, they can be classified as different class definitions by seeing a package name. In such language, it is possible to make packages and classes be integrated into a file as a module bundled for each provided function and distribute it.

Also, as a result of improvement of the performance of a computer and improvement of development efficiency, large-scale systems using a huge number of modules are increasing. In such a system, a dependence relationship exists between modules constituting the system, and the system is founded on a module of a specific version referring to another specific module to provide a specific function.

However, along with an enlarging scale of a system due to system updates and addition of functions, management of names, providing functions, versions, allocated places and the like of modules become complex. Therefore, problems such as collision of module names and packages, unexpected version dependence and an overlap of modules have been caused.

Accordingly, in recent years, a module management infrastructure which manages modules in units of bundles has been developed. A bundle includes definition information on the bundle in addition to a module. Definition information is a name that is called a symbolic name, a version number, a bundle to be referred to and the like. In a module management infrastructure, a module is classified by a pair of a symbolic name and a version number.

A module management infrastructure can verify versions and dependency relationships of bundles that are under control at the time of its activation, and detect collision of definition information of bundles and a mismatch of dependency relationships beforehand. Also, a module management infrastructure can update a bundle dynamically by managing a life cycle of the bundle. Therefore, according to a module management infrastructure, even in an environment where a system cannot be stopped, update as a bundle is possible. Recently, a module management infrastructure has been adopted in an application server and an integrated development environment, and the features such as a dynamic addition/deletion of a module and a non-stop module update are being utilized effectively.

For example, in patent document 1 (Japanese Patent Application Laid-Open No. 2012-93979), a technology which reduces a management load for modules by automatically generating a manifest file including definition information such as a symbolic name, a version number and a dependency relationship of a module in a module management infrastructure is disclosed.

Thus, in a module management infrastructure, a module which is made by dividing a program for each function is managed using a bundle including definitions such as a name and a version. Then, the module management infrastructure can perform state control of start and stop, confirm a dependency relationship with other bundles, and provide those functions to applications as a service.

However, although applications enjoy convenience thanks to these functions of a module management infrastructure, on the other side of a coin, the stringency of management of modules is increased, and thus more careful attention is needed for setting and updating definition information on a module than ever.

In a module management infrastructure like the one described in patent document 1, a pair of a version number and a symbolic name needs to be unique over the whole infrastructure. Therefore, there is a problem that, when a bundle having a same version number and a symbolic name has already exist on the module management infrastructure, a bundle added later is not loaded due to an error by collision of definition information on the bundles.

In a general module management infrastructure, it is possible to load bundles between which collision can happen, and give them bundle IDs in order of loading. However, there is a problem that another bundle having been added assuming use of a bundle of not being a management object refers to a wrong bundle, and, as a result, there is a possibility that an unexpected execution result will be caused.

An object of the present invention is to provide a module management apparatus, a module management system and a module management method which settle collision of definition information on bundles to enable coexistence of the bundles without correcting a bundle body, and compose a dependency relationship between the bundles correctly.

SUMMARY

A module management apparatus of the present invention, coordinates, in a time of start of a module management infrastructure carrying out integrated management of: a bundle having a module formed by a program described by an object oriented language and definition information including an attribute of the module; and a module group including a plurality of pieces of the bundle, when the bundle is loaded from a folder, and, if the definition information collides between different bundles, a reference relationship of the bundle by changing the definition information dynamically.

A module management method of the present invention, coordinates, in a time of start of a module management infrastructure carrying out integrated management of: a bundle having a module formed by a program described by an object oriented language and definition information including an attribute of the module; and a module group including a plurality of pieces of the bundle, when the bundle is loaded from a folder, and, if the definition information collides between different bundles, a reference relationship of the bundle by changing the definition information dynamically.

BRIEF DESCRIPTION OF THE DRAWINGS

Exemplary features and advantages of the present invention will become apparent from the following detailed description when taken with the accompanying drawings in which:

FIG. 5 is an example of a bundle information table according to the exemplary embodiment of the present invention;

FIG. 6 is an example of a symbolic name change management table according to the exemplary embodiment of the present invention.

EXEMPLARY EMBODIMENT

An exemplary embodiment of the present invention will be described with reference to drawings. Meanwhile, in the following exemplary embodiment, it is supposed that, as an attribute peculiar to OSGi (Open Services Gateway initiative), a bundle has a manifest file in which metadata such as a symbolic name and version information has been written. In this regard, however, the following exemplary embodiment is an example of the present invention, and, even if an object oriented language other than JAVA is used, the method according to the exemplary embodiment of the present invention can be applied to a module management system in which attribute management similar to that of OSGi is performed.

Exemplary Embodiment

Figure 1:
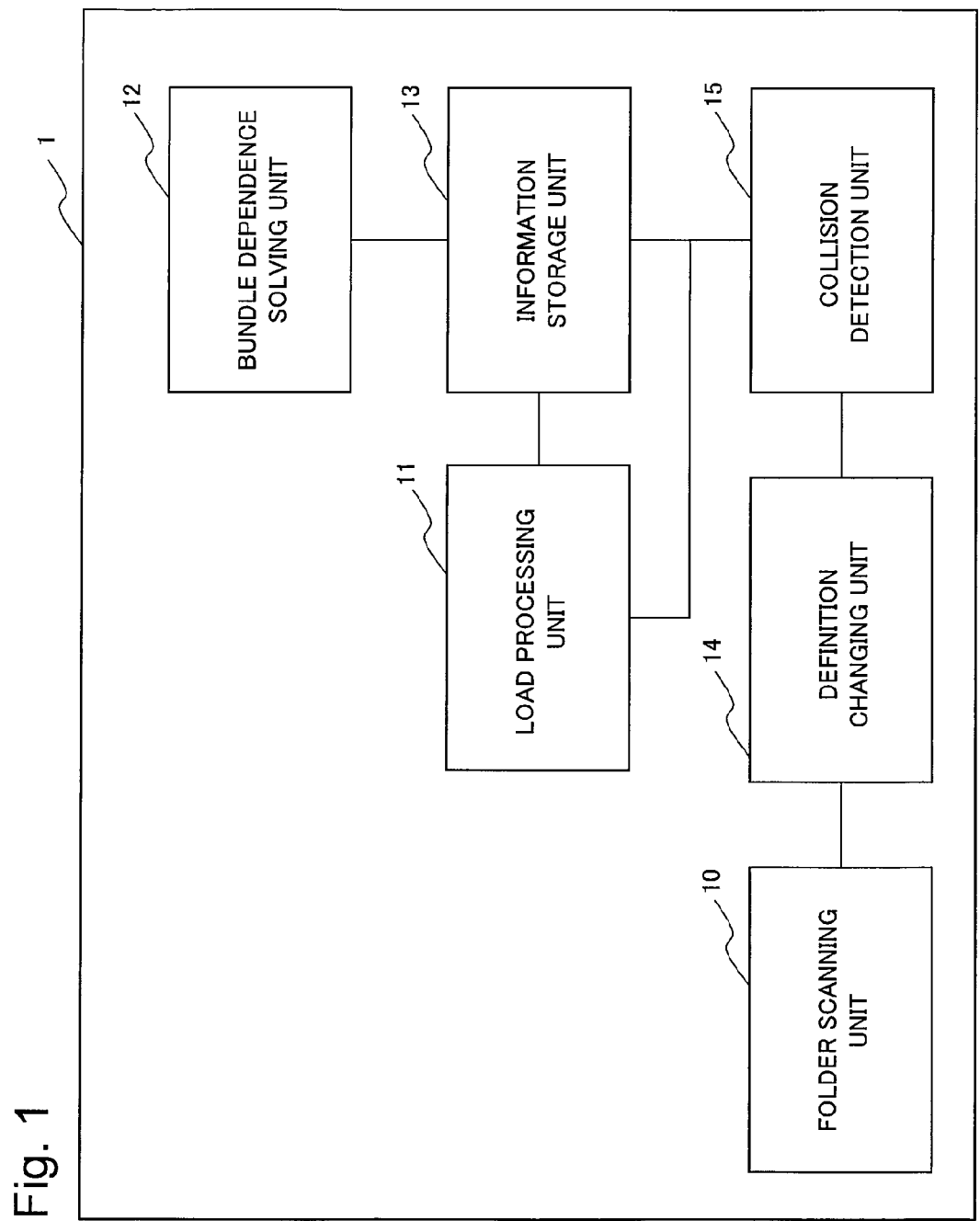
FIG. 1 is a block diagram showing logical configuration of a module management apparatus according to an exemplary embodiment of the present invention.
Figure 2:
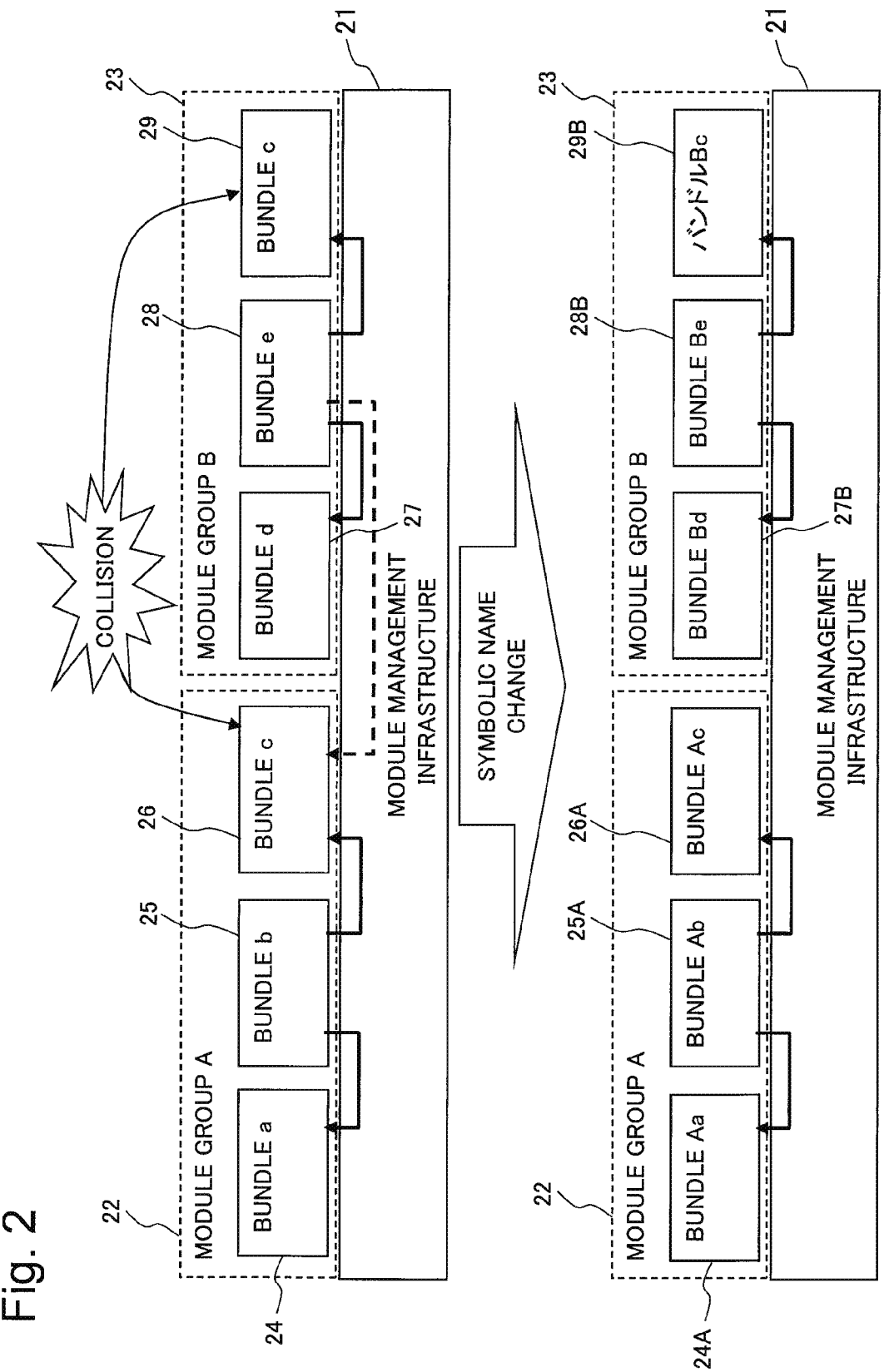
FIG. 2 is an exemplary configuration of a module management infrastructure according to the exemplary embodiment of the present invention.

FIG. 1 is a block diagram showing a logical configuration of a collision avoidance device 1 according to the exemplary embodiment of the present invention. Meanwhile, the collision avoidance device 1 according to this exemplary embodiment corresponds to a module management apparatus which performs processing for avoiding collision of definition information on a module. FIG. 2 is an exemplary configuration of a module management infrastructure according to the exemplary embodiment of the present invention.

Figure 3:
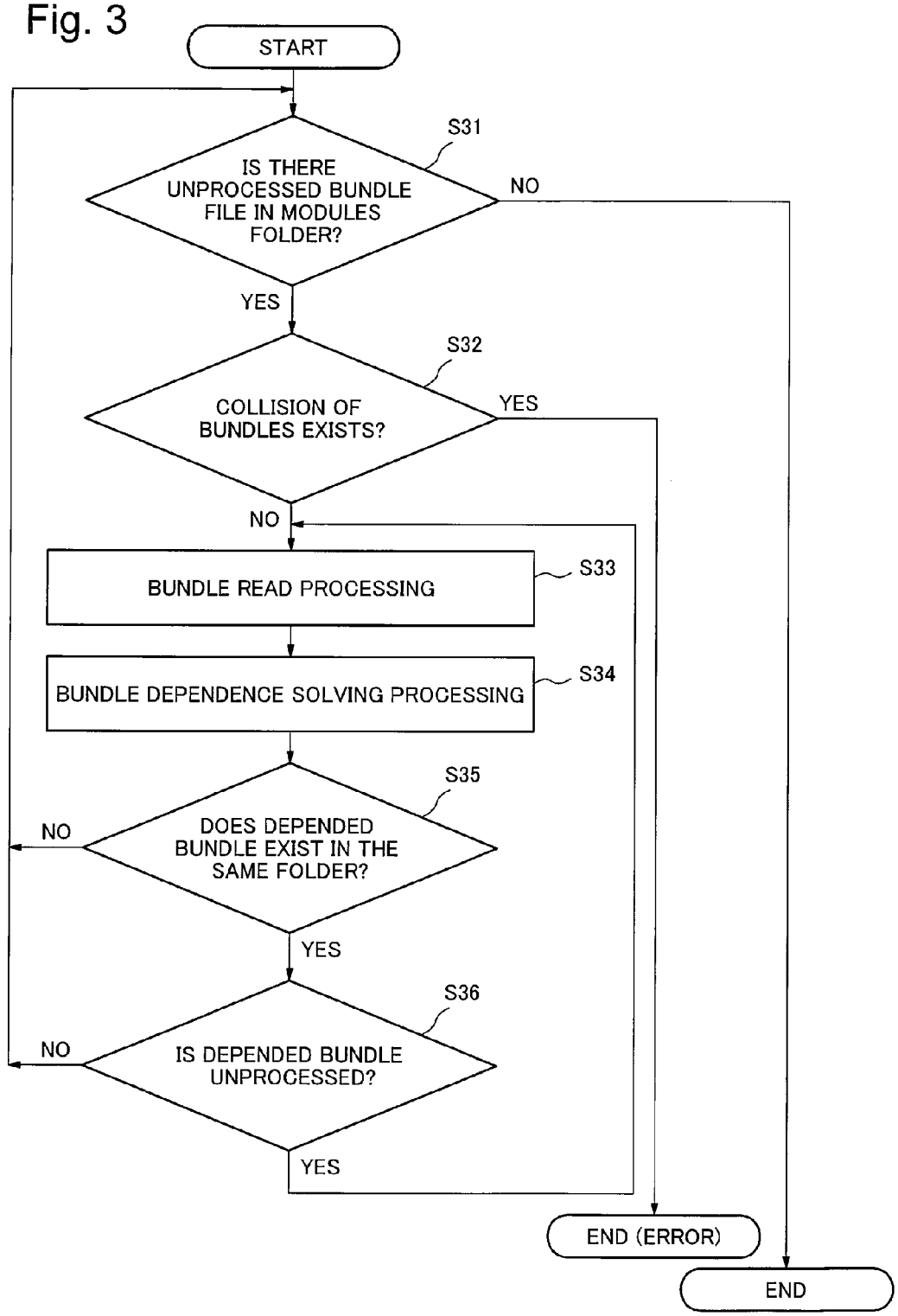
FIG. 3 is a flow chart showing a load processing of a common bundle according to the exemplary embodiment of the present invention.
Figure 4:
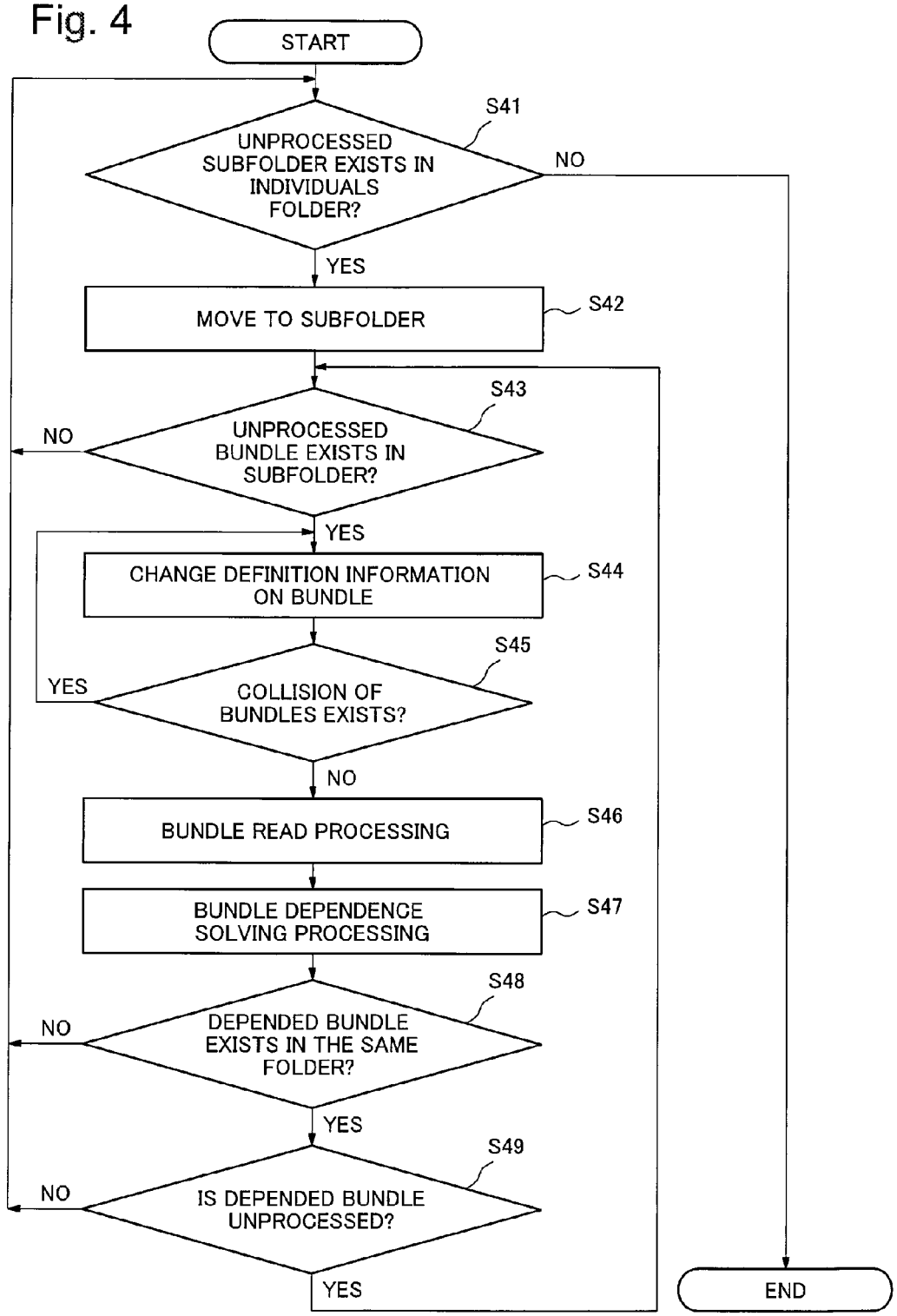
FIG. 4 is a flow chart showing load processing of an individual bundle according to the exemplary embodiment of the present invention.

FIG. 3 is a flow chart showing load processing of a common bundle according to the exemplary embodiment of the present invention. FIG. 4 is a flow chart showing load processing of an individual bundle according to the exemplary embodiment of the present invention.

FIG. 5 shows a bundle information table 50 (a first table) in which definition information, a dependency relationship and the like of a bundle are gathered. In FIG. 6A, a symbolic name change management table 60 (a second table) in which the file path of a bundle and a change history of a symbolic name are gathered is shown. Meanwhile, it is supposed that the bundle information table 50 and the symbolic name change management table 60 are stored in a memory which is the main memory usually. In this regard, however, the bundle information table 50 and the symbolic name change management table 60 may be included in a component of FIG. 1, and can be stored inside an information storage unit 13.

(Structure)

In FIG. 1, the collision avoidance device 1 according to this exemplary embodiment includes a folder scanning unit 10, a load processing unit 11, a bundle dependence solving unit 12, the information storage unit 13, a definition changing unit 14 and a collision detection unit 15.

The folder scanning unit 10 confirms whether an unprocessed bundle file exists or not inside a common bundle arrangement folder and an individual bundle arrangement folder. Meanwhile, hereinafter, the common bundle arrangement folder is described as a modules folder and an individual bundle arrangement folder is described as an individuals folder.

The load processing unit 11 performs read processing of a bundle. In read processing of a bundle, information on a bundle is added to the bundle information table 50, and the updated bundle information is stored in the information storage unit 13.

A dependence solving processing unit 12 performs solving processing of a dependency relationship between bundles. When a bundle file is loaded, the dependence solving processing unit 12 performs linking processing of a dependent bundle according to the definition information on a reference target, in order to coordinate a reference relationship of bundle files.

The information storage unit 13 stores a bundle and bundle information. The information storage unit 13 adds and updates information of a table. The information storage unit 13 may store information about a bundle such as the bundle information table 50 and the symbolic name change management table 60, or may store only information to be recorded in those tables.

The definition changing unit 14 changes definition information on a bundle. For example, definition information on a bundle has meta information consisting of a character string, a symbol string or the like which specifies the bundle uniquely, such as a symbolic name and version information. For example, as mentioned later, the definition changing unit 14 can change definition information by attaching a part or all of a subfolder name to the head of a symbolic name, or attaching a symbol or a character such as an underbar to it.

Meanwhile, definition information is not limited to a symbolic name, and should only be information which can specify that bundle uniquely. As change of the definition information, addition or deletion of a specific character, a changing condition defined specially, a general change method of a character string and a symbol string and the like can be used.

The collision detection unit 15 detects whether collision of definition information on bundles happens or not using definition information of FIG. 5 changed by the definition changing unit 14. Specifically, the collision detection unit 15 will refer to the bundle information table 50 and detect whether collision occurs between a bundle which has been loaded before and a bundle which has been loaded later.

FIG. 2 indicates an exemplary configuration of a module management infrastructure 21 according to the exemplary embodiment of the present invention. Meanwhile, in FIG. 2, a reference relationship between bundles is indicated by an arrow. A bundle in the starting point of an arrow refers to a bundle in the end of the arrow. An arrow of a dotted line in the upper section diagram of FIG. 2 shows that collision happens by a wrong reference.

The upper section of FIG. 2 indicates a state that a bundle a 24, a bundle b 25 and a bundle c 26 belonging to a module group A 22 and a bundle d 27, a bundle e 28 and a bundle c 29 belonging to a module group B 23 are made to operate on the module management infrastructure 21 without changing definition information. Meanwhile, in FIG. 2, it is supposed that symbolic names are identical with the respective bundle names. Also, in the example of FIG. 2, it is supposed that the bundles of the module group A22 are loaded first, and the bundles of the module group B23 are loaded after that.

In the upper section of FIG. 2, the bundle b 25 of the module group A 22 is referring to the bundle a 24 and the bundle c 26. The bundle e 28 of the module group B 23 is referring to the bundle d 27 and the bundle c 29.

In the upper section of FIG. 2, it is also supposed that the bundle c 26 of the module group A 22 and the bundle c 29 of the module group B 23 are different bundles although definition information such as the symbolic names are the same.

Here, when the configuration in the upper section of FIG. 2 is taken, the bundle e 28 belonging to the module group B 23 that has been loaded later refers to by mistake the bundle c 26 of the module group A 22 having been loaded before, and collision of definition information on bundles occurs. Essentially, the bundle e 28 should operate referring to the bundle c 29 that belongs to the module group B 23. Therefore, if the bundle e 28 of the module group B 23 refers to the bundle c 26 belonging to the module group A 22, it leads to an unintended operation of an application.

The lower section of FIG. 2 indicates an exemplary configuration of the module management infrastructure 21 according to the exemplary embodiment of the present invention. In the example of the lower section of FIG. 2, at the time when the bundle a 24, the bundle b 25 and the bundle c 26 belonging to the module group A 22 are loaded in the module management infrastructure 21, the symbolic names of them are changed to a bundle Aa, a bundle Ab and a bundle Ac, respectively, dynamically. Similarly, the symbolic names of the bundle d 27, the bundle e 28 and the bundle c 29 belonging to the module group B 23 are changed to a bundle Bd, a bundle Be and a bundle Bc, respectively. Meanwhile, it is supposed that a reference relationship between bundles is changed simultaneously at the time of change of the symbolic names as mentioned later.

As a result, a wrong reference like the upper section of FIG. 2 is not made in the example in the lower section of FIG. 2, and a reference relationship between bundles will be maintained correctly. Therefore, the bundle Be belonging to a module group B 23 does not refer to the bundle Ac of the module group A 22 by mistake. Therefore, collision of definition information on bundles is avoided, and application will operate correctly.

(Operation)

In a module management apparatus according to the exemplary embodiment of the present invention, collision of definition information on bundles is evaded by the following operation using a collision avoidance device equipped with the aforementioned configuration.

In the following operation, load processing of a bundle in the modules folder which is a common bundle arrangement folder is performed in Process 1. Next, in Process 2, load processing of the individuals folder which is an individual bundle arrangement folder is performed.

[Process 1]

First, using FIG. 3, Process 1 in which the module management infrastructure 21 starts and carries out load processing of a bundle will be described.

In FIG. 3, in the load processing of Process 1, the folder scanning unit 10 confirms whether there is an unprocessed bundle file in the modules folder, first (Step 31).

When there is an unprocessed bundle, it moves to load processing (it advances towards Step 32). When there are no unprocessed bundles, the flow of Process 1 is finished, and the processing moves to load processing of Process 2.

Next, the collision detection unit 15 refers to the bundle information table 50, and confirms whether collision of definition information on a bundle already loaded (it corresponds to first definition information) and definition information on an unprocessed bundle (it corresponds to second definition information) occurs or not (Step 32).

When definition information on the already loaded bundle and the unprocessed bundle does not collide, the load processing unit 11 performs read processing of the unprocessed bundle (Step 33).

In Step 32, when collision of the definition information on the already loaded bundle and on the unprocessed bundle occurs, load processing is ended as an error.

In the read processing of a bundle, information on the bundle is added to the bundle information table 50, and bundle information is stored in the information storage unit 13 (Step 33).

After that, as bundle dependence solving processing, the dependence solving processing unit 12 performs linking processing of a dependent bundle (Step 34). If the bundle dependence solving processing is finished, the processing returns to Step 31.

When another bundle on which the bundle in question depends is in the same folder (in Step 35, Yes), and that is an unprocessed bundle (in Step 36, Yes), the folder scanning unit 10 performs load processing of that unprocessed bundle (Step 33).

Here, the processing of Steps 33-36 is repeated until collision of definition information on bundles is settled.

When there is no bundle on which the bundle in question depends in the identical folder (in Step 35, No), or when there is no unprocessed bundle in bundles on which the bundle in question depends (in Step 36, No), load processing of another unprocessed bundle which is in the modules folder is performed (the process returns to Step 31).

The above is the procedure of Process 1. Meanwhile, the above mentioned procedure is an example of this exemplary embodiment, and Process 1 should only be such that a bundle can be loaded without collision of definition information on bundles, but with a correct dependency relationship, from a common bundle arrangement folder.

Thus, when load processing of all bundles in the modules folder (Process 1) is completed, the folder scanning unit 10 moves to load processing of a bundle in the individuals folder (step 2).

[Process 2]

Next, Process 2 for carrying out load processing of the individuals folder will be described using FIG. 4.

In FIG. 4, the folder scanning unit 10 confirms whether an unprocessed subfolder is in the individuals folder or not (Step 41).

When there is an unprocessed subfolder (in Step 41, Yes), the folder scanning unit 10 moves to the subfolder (Step 42).

When there are no subfolders (in Step 41, No), it ends load processing.

After the folder scanning unit 10 has moved to a subfolder, it confirms whether an unprocessed bundle exists in the subfolder or not (Step 43).

When an unprocessed bundle is found, the definition changing unit 14 changes the definition information on the bundle (Step 44).

In the example shown in FIG. 2, in changing definition information on a bundle indicated in Step 44, a subfolder name is added to the head of a symbolic name which is the definition name of the bundle, and the information is added to the symbolic name change management table 60.

After that, the collision detection unit 15 refers to the bundle information table 50 and the symbolic name change management table 60, and checks existence or non-existence of collision (Step 45). Here, Steps 44 and 45 are continued until collision of definition information on bundles is settled. Meanwhile, definition information which has been changed in these steps as a result of existence of collision corresponds to the third definition information.

When collision of definition information on bundles does not occur (in Step 45, No), the load processing unit 11 performs read processing (Step 46).

When there is collision of definition information on bundles (in Step 45, Yes), definition information on the bundle is changed again (the process returns to Step 44).

For example, in Step 45, when there is collision of definition information on bundles, a symbol and a character such as underbar is added to the symbolic name of the bundle, and the symbolic name is changed further to a value which does not cause collision (Step 44).

When the load processing is completed, bundle information is allocated in the information storage unit 13, and information is added to the bundle information table 50 and the symbolic name change management table 60.

Linking processing of a dependent bundle is performed by the dependence solving processing unit 12 for the loaded bundle (Step 47). On this occasion, when both a loaded bundle and a bundle on which the loaded bundle depends exist in the same folder, the dependence symbolic names of the respective bundles in the bundle information table are rewritten to the values after change so that the bundle in the same folder for which the symbolic name has been changed can be referred to.

When there is a bundle on which the loaded bundle depends in the same folder (in Step 48, Yes), and the former bundle is an unprocessed bundle (in Step 49, Yes), the folder scanning unit 10 performs load processing of the former bundle (Step 46).

When there are no bundles on which the loaded bundle depends in the same folder (in Step 48, No) or there are no unprocessed bundles (in Step 49, No), load processing of another unprocessed bundle is performed (the processing returns to Step 41).

When an unprocessed bundle runs out in the subfolder after the above-mentioned Steps 43-49 have been repeated, the processing moves to another subfolder, and load processing is performed (the processing returned to Step 41).

The above is the flow of Process 2. Meanwhile, the above mentioned flow is an example of this exemplary embodiment, and, in Process 2, it should only be such that a bundle can be loaded from the individual bundle arrangement folder with a right dependency relationship and without collision of definition information on bundles.

When the above mentioned Process 1 and Process 2 are finished, loading of all bundles is completed.

As above, processing by a collision avoidance device according to the exemplary embodiment of the present invention just loads bundles in a folder continuously. As a result, bundles loaded in Process 1 can be shared by a whole module management infrastructure, and a bundle in a subfolder below the individuals folder loaded in Process 2 can operate in a manner forming a dependency relationship with bundles in the folder.

In the present invention, collision of and false reference to definition information caused by modules managed by a module management infrastructure being referred to in a same space is settled by changing definition information based on a folder to which each bundle belongs and separating the space. As a result, collision of definition information on bundles can be avoided, and, at the same time, sharing and individualization of a bundle can be realized on the module management infrastructure by separating bundles by a folder.

Also, according to a module management apparatus according to the exemplary embodiment of the present invention, in OSGi, it becomes possible to perform loading free from collision and build a right dependency relationship by rewriting definition information on a memory when a bundle is loaded.

Generally, it is necessary for a bundle including a module that a pair of a version number and a symbolic name is unique in the whole infrastructure. Therefore, when a bundle with a same version number and a symbolic name has been already on the module management infrastructure, a bundle which has been added later is not loaded due to an error by collision.

In a general module management infrastructure, a bundle which can cause collision can be loaded according to a setting. In such cases, bundles will be distinguished only by an ID (Identification) called as a bundle ID that is given in order of loading. Therefore, it is difficult to identify an intended bundle correctly.

In this way, in a general module management infrastructure, although a bundle which has collided is rejected to be an object of management, another bundle having been added assuming use of the rejected bundle builds a dependency relationship with a bundle loaded previously. Therefore, a reference relationship of bundles may be changed according to circumstances, causing an unexpected execution result.

Previously, in order to settle a problem of such general module management infrastructure, it has been necessary to create a bundle considering collision of symbolic names of bundles, and correct it point by point when collision has occurred.

In a general module management infrastructure, when a module group which provides a certain function of a system is moved onto a specific module management infrastructure, for example, and if a bundle which is included in the module group which is a black box has been created based on OSS (Open Source Software) or the like, a situation that collision of definition information with a bundle having been created based on the same OSS and already registered is caused and the bundle in question cannot be registered is thinkable.

In a general module management infrastructure, when such situation is caused, a dependency relationship is configured using a bundle having been registered first among the bundles which have collided with each other in accordance with definition information in that bundle. However, two bundles which have collided with each other are not always the completely same ones. Therefore, when the two bundles provide different functions, or are dependent on different bundles, a behavior as the whole module groups will be changed due to composing a dependency relationship different from supposition.

According to the exemplary embodiment of the present invention, in a module management infrastructure which carries out integrated management of modules made by dividing a program for each function, the modules are allocated in a manner being separated and order of loading is changed compared with a general management infrastructure. Therefore, collision of definition names (symbolic names) of modules (bundles) which change definition information dynamically on a memory at the time of loading and formulation of a wrong dependency relationship caused by that can be avoided without correcting a module itself.

Also, in changing definition information in the exemplary embodiment of the present invention, collision of definition information on bundles is avoided using a method to re-attach definition information which does not cause collision, by such as changing a definition name of a bundle at the time of loading, and unifying bundles in a folder as one bundle by re-formulating them after analyzing them.

As a result, concurrent operations of module groups having the huge number of complicated dependency relationships which have not operated due to collision of modules up to now become possible, and thus easiness of extension, operation and maintenance of a system can be realized.

Meanwhile, the example used in the description of the exemplary embodiment of the present invention is one example, and it does not limit the scope of the present invention.

The present invention will be described in detail giving examples. Further, a bundle information table and a symbolic name change management table used in each example have information different from values indicated on the tables of FIG. 5 and FIG. 6. However, in order to clearly specify portions of an item name and information to be updated, description will be made with reference to the bundle information table 50 and a symbolic name change management table 60. Meanwhile, a table which reflects actual values will be omitted.

EXAMPLE 1

Example 1 will be described using FIGS. 7-10. Example 1 is an example in which a module group A 72 being operating on a module management infrastructure A 71 and a module group B 74 being operating on a module management infrastructure B 73 are transplanted to a module management infrastructure C 101 and makes them operate concurrently.

(Structure)

Figure 8:
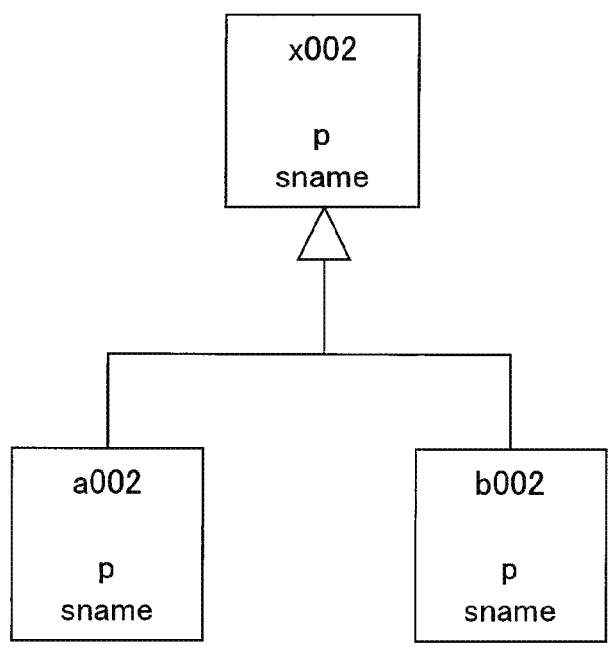
FIG. 8 is a diagram showing relation of bundles according to example 1 of the present invention.
Figure 9:
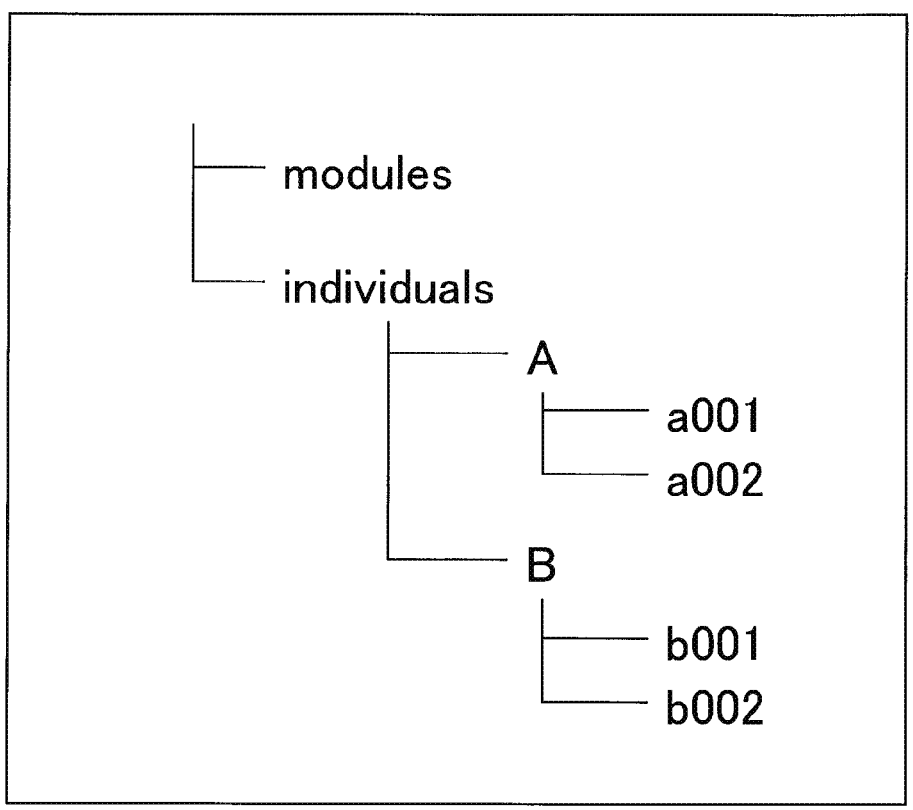
FIG. 9 is a diagram showing a folder structure according to example 1 of the present invention.

Block diagrams of bundles in the module management infrastructure A 71 and the module management infrastructure B 73 are shown in FIG. 7. FIG. 8 shows relation between a bundle a002, a bundle b002 and a bundle x002. FIG. 9 shows a folder structure of bundles a001, a002, b001 and b002 in the environment that the module management infrastructure C 101 operates.

Figure 7A:
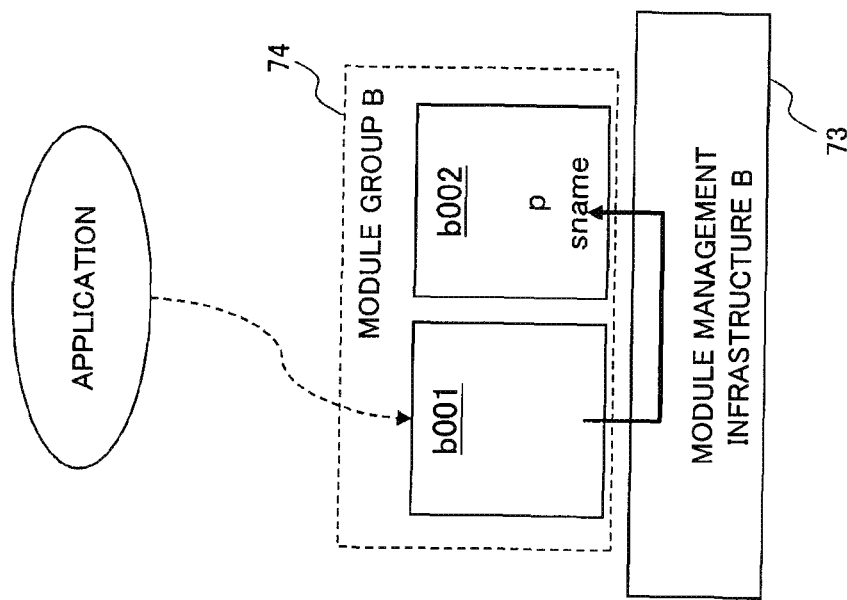
FIG. 7A is a block diagram of a module group A in a module management infrastructure according to example 1 of the present invention.
Figure 7B:
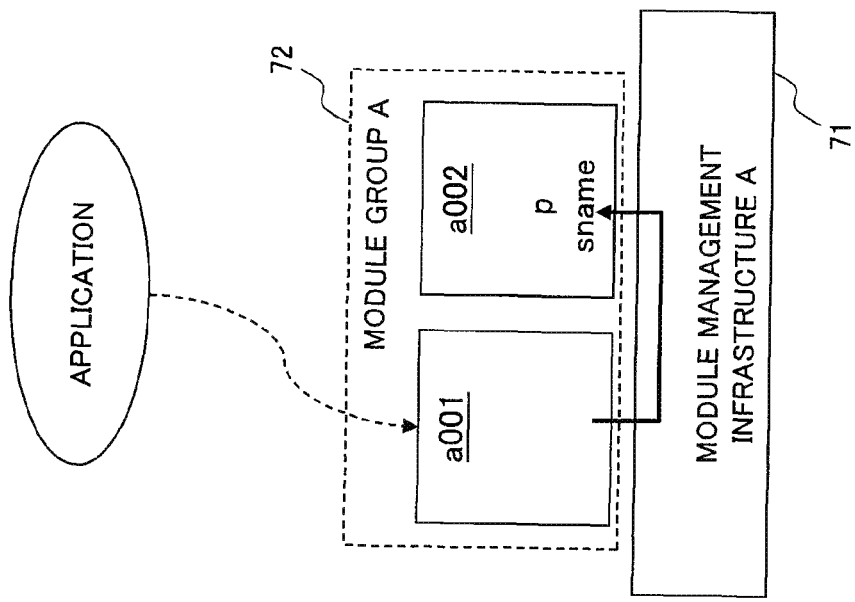
FIG. 7B is a block diagram of a module group B in a module management infrastructure according to example 1 of the present invention.

As shown in FIG. 7A, the module group A 72 includes the bundle a001 and the bundle a002. The bundle a001 is referring to a package p of the bundle a002. As shown in FIG. 7B, the module group B 74 includes a bundle b001 and the bundle b002. The bundle b001 is referring to a package p of the bundle b002.

As shown in FIG. 8, both of the bundle a002 and the bundle b002 are made in a manner succeeding the bundle x002. Therefore, the bundle a002 and the bundle b002 have different classes, respectively, in addition to the common package p. The bundle a002 and the bundle b002 have a symbolic name sname and version number 1.0 that are common in definition information on a bundle.

(Operations)

Figure 10:
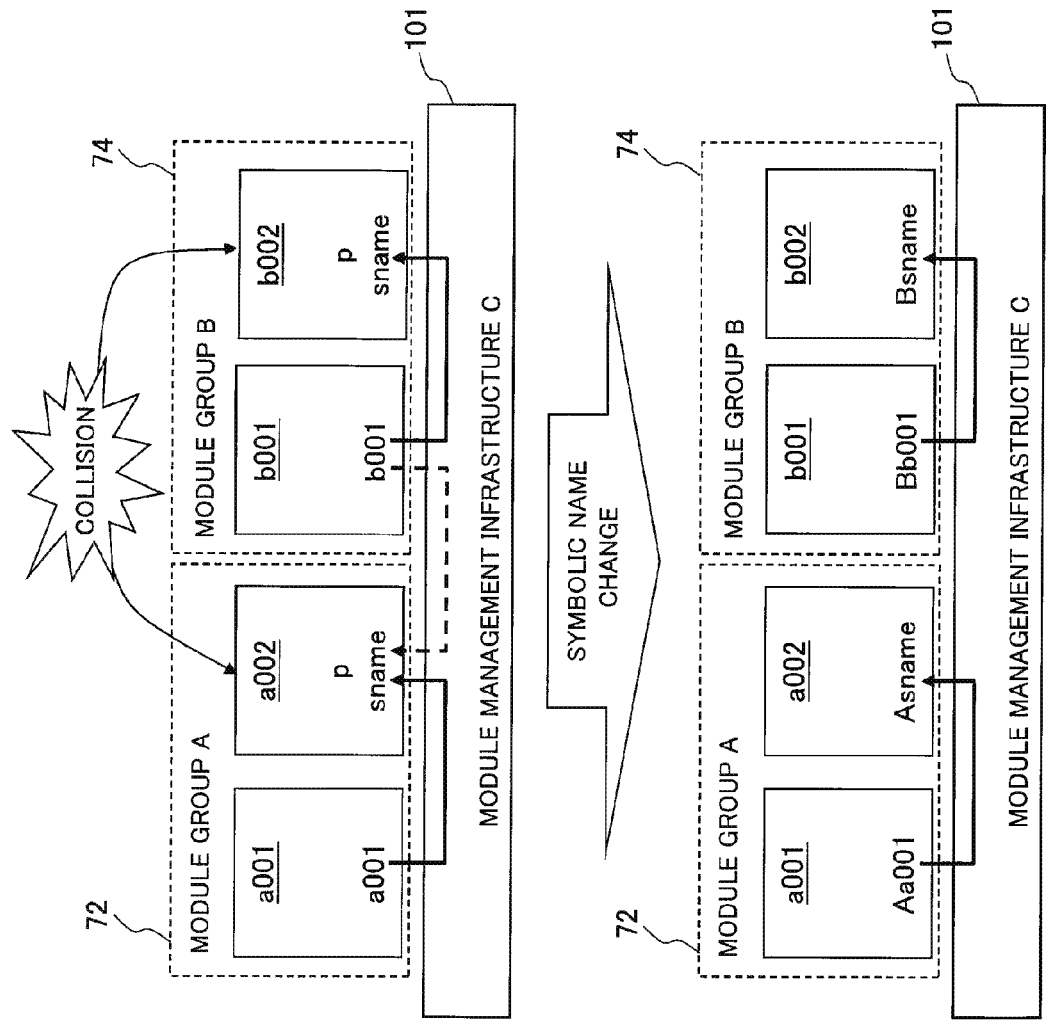
FIG. 10 is a diagram showing a state of a bundle on a module management infrastructure according to example 1 of the present invention.

FIG. 10 shows a state of the module management infrastructure C 101 after load of the bundles in example 1. The upper section of FIG. 10 is a general example in which symbolic names are not changed, and the lower section is an example according to the present invention in which symbolic names are changed. The upper section of FIG. 10 schematically shows by the arrow of a dotted line that, although the bundle b001 should refer to the bundle b002 that has been loaded later, it is referring to the bundle a002 having been loaded previously, resulting in collision of definition information on bundles.

Example 1 according to the present invention will be described using the diagram of the lower section of FIG. 10.

When the module management infrastructure C 101 starts, the folder scanning unit 10 checks the modules folder set as a storage location of bundles in advance, and begins load of a bundle.

In example 1, because a bundle is not being allocated in the modules folder, load processing is not performed. Therefore, the folder scanning unit 10 performs nothing here, and then begins load of bundles stored in subfolders below the individuals folder.

First, the folder scanning unit 10 loads the module group A 72 that is below an individuals/A folder.

In the load of the module group A 72, when a bundle in the folder A is loaded, the definition changing unit 14 adds "A" to the head of the symbolic name of the bundle and then it is loaded. As a result, when the bundle a001 is loaded, the symbolic name of the bundle a001 will be Aa001. At that time, the collision detection unit 15 refers to the bundle information table 50 of FIG. 5 and the symbolic name change management table 60 of FIG. 6, and checks presence or absence of collision between an already loaded bundle and a bundle loaded newly.

In example 1, because there are no bundles having been read at this time point, the loading succeeds without generating an error.

When load processing of a bundle succeeds, the bundle is arranged in the information storage unit 13, and information is added to the bundle information table 50 and the symbolic name change management table 60 on the memory.

Similarly about loading of the bundle a002, the definition changing unit 14 changes the symbolic name of the bundle a002 to Asname, and the collision detection unit 15 checks presence or absence of collision, and the information storage unit 13 adds information to the tables.

At that time, the dependence solving processing unit 12 confirms that the bundle a001 is referring to the bundle a002, and performs linking processing which changes the dependent bundle name of the bundle information table 50 to Aa001 from a001.

Next, the folder scanning unit 10 loads the module group B 74 that is below an individuals/B folder.

In loading of the bundle b001, the definition changing unit 14 changes the symbolic name of the bundle b001 to Bb001. The collision detection unit 15 confirms collision with the already loaded bundles, and adds bundle information to the information storage unit 13. Here, in loading of the bundle b002, the definition changing unit 14 changes the symbolic name of the bundle b002 to Bsname. Then, the collision detection unit 15 confirms about collision, and adds information to the tables of the information storage unit 13. Because the bundle b001 depends on the bundle b002 also here, the dependence solving processing unit 12 changes the dependent bundle name of the bundle b002 in the bundle information table 50 to Bb001 from b001.

As a result, the module group A 72 and the module group B 74 are loaded in the module management infrastructure C 101 while keeping a dependency relationship between the respective bundles, and they operate independently as they has been operating in the module management infrastructure A 71 and the module management infrastructure B 73.

In example 1, collision of definition information on bundles has been avoided by changing the symbolic names of the bundle a002 of the individuals/A folder and the bundle b002 of the individuals/B folder (the lower section of FIG. 10). If the symbolic names have not been changed, collision would occur between the symbolic name sname of the bundle a002 and the symbolic name sname of the bundle b002, causing an error (the upper section of FIG. 10).

Here, order of the load of the individuals/A folder and the individuals/B folder depend on implementation of a module management infrastructure. In the exemplary embodiment of the present invention, even when the module group B 74 is loaded first, change processing of a symbolic name is carried out for a bundle in the module group A 72, and they operate well.

EXAMPLE 2

Example 2 is an example in which three bundles operate in a module management infrastructure, and the symbolic name of a bundle having referring and referenced relationships with two bundles is changed.

Figure 11:
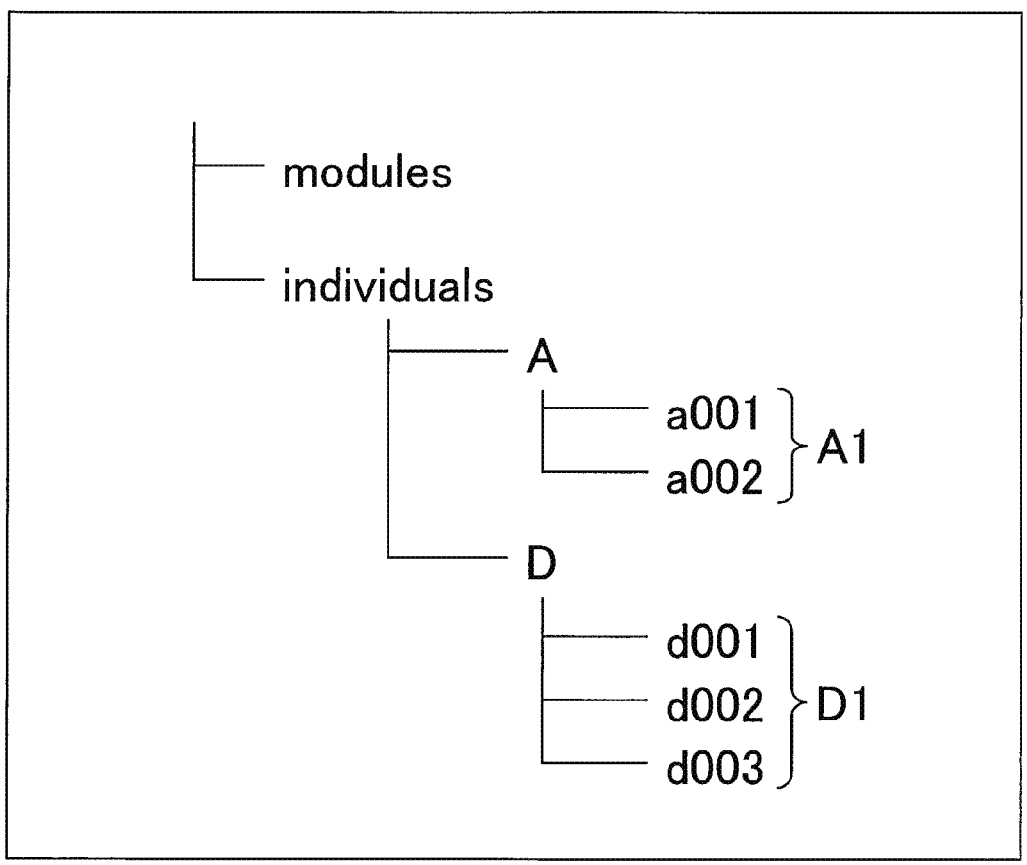
FIG. 11 is a diagram showing a folder structure according to example 2 of the present invention.
Figure 12:
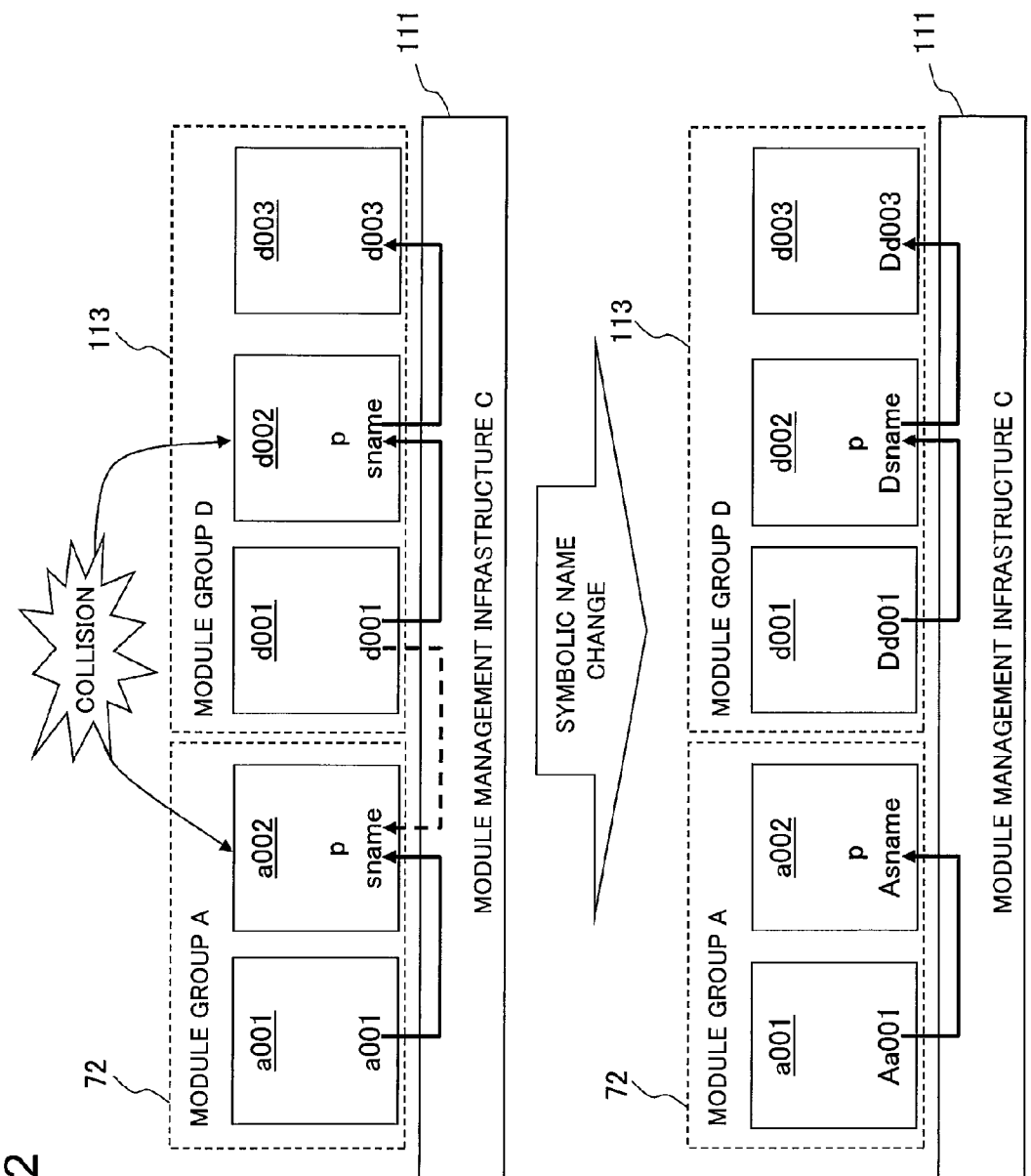
FIG. 12 is a diagram showing a state of a bundle on a module management infrastructure according to example 2 of the present invention.

The folder structure of example 2 is shown in FIG. 11, and an overall block diagram is shown in FIG. 12. The upper section of FIG. 12 is a general example in which a symbolic name is not changed, and the lower section is an example according to the exemplary embodiment of the present invention in which a symbolic name is changed. The upper section of FIG. 12 shows schematically that, by the arrow of a dotted line, although a bundle d001 should refer to a bundle d002 which has been loaded later, it is referring to the bundle a002 having been loaded before, resulting in collision of definition information on bundles.

(Structure)

Example 2 will be described using the lower section diagram of FIG. 12. In a module group D113 including three bundles, the respective bundles are referred to as the bundle d001, the bundle d002 and a bundle d003. It is supposed that the bundle d001 refers to a package p of the bundle d002, and the bundle d002 refers to a bundle d003.

The bundle d002 succeeds to the bundle x002 like the bundle a002 and the bundle b002, and has a specific class in addition to the common package p.

It is also supposed that the bundle definition information on the bundle d002 has a symbolic name sname that is common with the bundle a002, and thus when both of the bundle d002 and the bundle a002 are loaded, collision occurs if they are left without change (Operations)

Description of example 2 according to the present invention will be described using the diagram of the lower section of FIG. 12.

First, a module management infrastructure C111 completes load processing of the modules folder and performs load processing of the module group D113.

The module group D113 is included in an individuals/D folder. First, the bundle d001 is loaded by the folder scanning unit 10.

The definition changing unit 14 changes the symbolic name of the bundle d001 to Dd001. The collision detection unit 15 confirms that collision of bundle definition information does not occur, and allocates bundle information in the information storage unit 13, and finishes loading.

In load processing of the bundle d002, by the definition changing unit 14 changing the symbolic name of d002 to Dsname and performing loading, collision of the bundle d002 and the bundle a002 is avoided. At that time, the dependence solving processing unit 12 rewrites a reference target of the bundle information table 50 on the memory about the bundle d001, which has been loaded already and which refers to the bundle d002, to Dsname.

Finally, load processing of the bundle d003 is carried out. In the load processing of the bundle d003, the definition changing unit 14 changes the symbolic name of the bundle d003 to Dd003. Then, the collision detection unit 15 confirms that there is no collision, and makes the bundle to be allocated in the information storage unit 13.

After that, in the symbolic name change management table 60, the dependence solving processing unit 12 confirms that the symbolic name of the bundle d002 on which it depends has been changed. Then, the dependence solving processing unit 12 changes the symbolic name of the referred bundle of the bundle d003 on the bundle information table 50 to Dsname.

Thus, the reference information of the bundle d001 and the bundle d003 to the bundle d002 is changed, and the load processing is completed.

EXAMPLE 3

Example 3 is an example in which a bundle in a subfolder below the individuals folder refers to a bundle of the modules folder.

Figure 13:
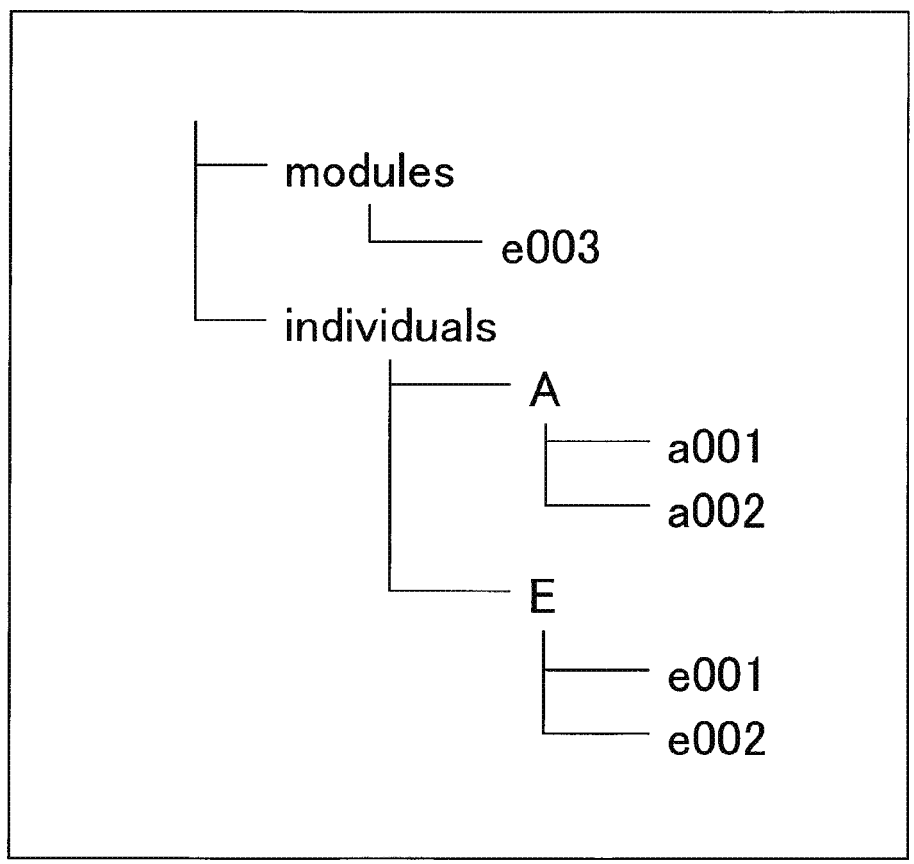
FIG. 13 is a diagram showing a folder structure according to example 3 of the present invention.
Figure 14:
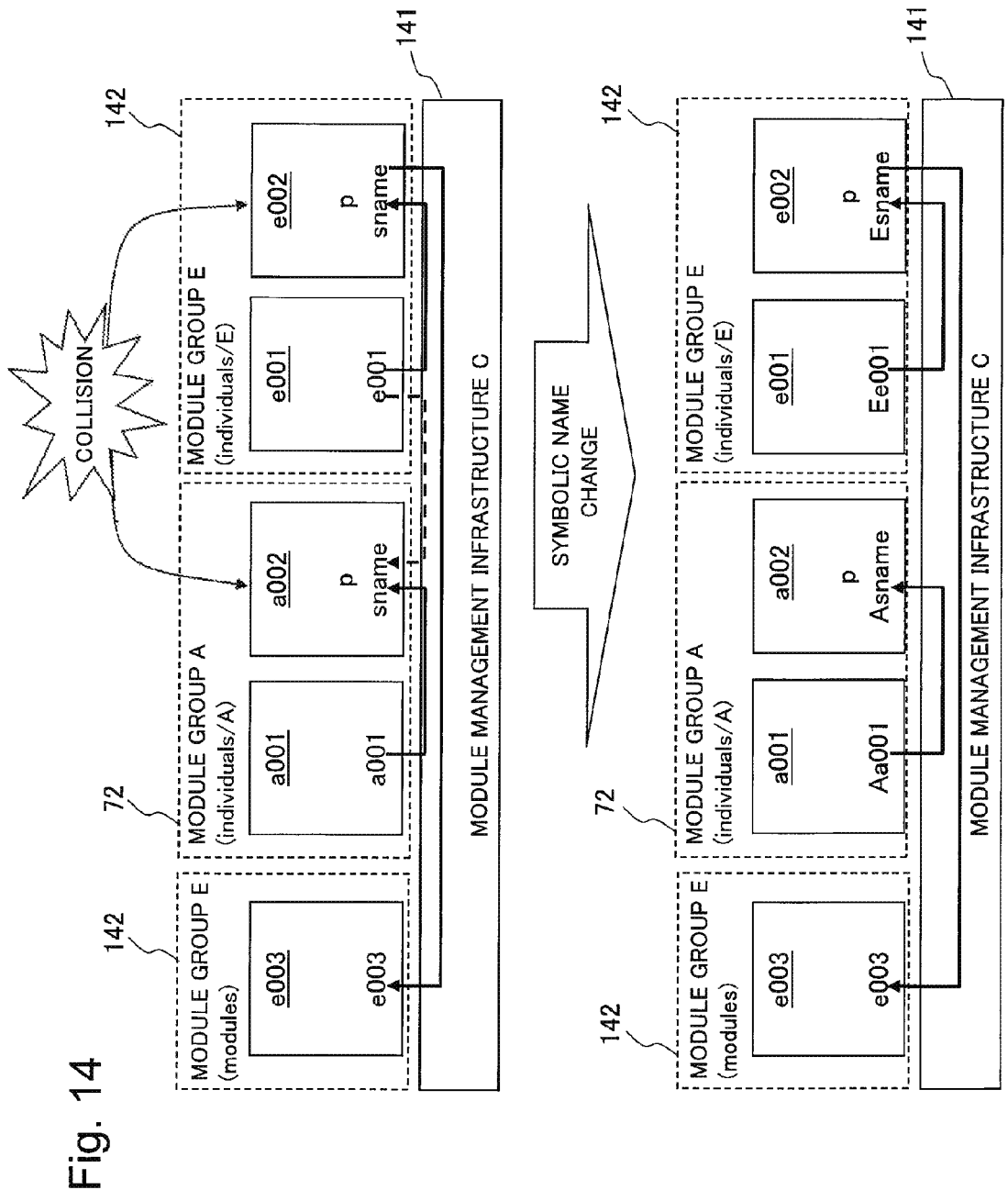
FIG. 14 is a diagram showing a state of a bundle on a module management infrastructure according to example 3 of the present invention.

The folder structure of example 3 is shown in FIG. 13, and an overall block diagram at the time point of completion of load processing is shown in FIG. 14. The upper section of FIG. 14 is a general example in which a symbolic name is not changed, and the lower section is an example according to the exemplary embodiment of the present invention that changes a symbolic name. In the upper section of FIG. 14, the arrow of a dotted line shows that, although a bundle e001 should refer to a bundle e002 which has been loaded later, it is referring to the bundle a002 having been loaded before. As a result, it shows that collision of definition information on bundles happens schematically. Meanwhile, the reason why a module group E 142 is being drawn in a manner being divided into two parts in FIG. 14 is to distinguish difference of folders in which those bundles exist and presence or absence of change of the symbolic name. In the following description, it is supposed that the module group A 72 has been already loaded.

(Structure)

The module group E 142 includes three bundles of the bundle e001, the bundle e002 and a bundle e003. It is supposed that the bundle e002 has been made in a manner succeeding to the bundle x002 like the bundle a002. It is supposed that, because the bundle a002 and the bundle e002 have a common symbolic name sname, when loaded simultaneously, collision occurs. The bundle e001 refers to a package p of the bundle e002, and the bundle e002 refers to the bundle e003.

In this regard, however, it is supposed that the bundle e003 can also be used by other bundles as a bundle which provides a common function. It is also supposed that all bundles belonging to the module group E 142 have been stored in a same directory in a module management infrastructure E (not shown). Meanwhile, although the bundle e001 and the bundle e002 are arranged in the individuals/E folder, the bundle e003 is arranged in the modules folder so that it can be also referred to by other bundles because it is a bundle which provides a common function.

(Operations)

Operations of a module management apparatus according to example 3 will be described using the diagram of the lower section of FIG. 14.

First, the module group E 142 is moved to a module management infrastructure C141, and then loaded. When the module management infrastructure C141 begins load processing, the folder scanning unit 10 loads the bundle e003 in the modules folder first.

A symbolic name is not changed in the modules folder. Therefore, the collision detection unit 15 confirms that there is no collision with already loaded bundles, and then ends load processing after storing information on the bundle e003 in the information storage unit 13 and adding it to the bundle information table 50. In the dependence solving processing unit 12, it is confirmed that the bundle e003 is only for the purpose of being referred to.

Entire loading of a bundle of the modules folder is completed by this. The processing of the folder scanning unit 10 moves to load processing of module groups which are below the individuals folder.

In load processing of the individuals/E, the definition changing unit 14 changes the symbolic name of the bundle e001 to Ee001, first. Then, the collision detection unit 15 confirms that there is no collision of definition information on bundles, and finishes loading with no problem.

In load of the bundle e002, the definition changing unit 14 changes the symbolic name of the bundle e002 to Esname, and the bundle information is stored in the information storage unit 13 after the collision detection unit 15 has confirmed that there is no collision. Here, the dependence solving processing unit 12 updates the reference information in the bundle information table 50 of the bundle e001 that refers to the bundle e002 so that the symbolic name after change is referred to. In this regard, however, the reference information on the memory of the bundle e003 in the modules folder to which the bundle e002 refers is not changed because the bundle e003 is only for the purpose of being referred to.

As a result, a bundle in a subfolder existing below the individuals folder can refer to the bundle e003 in the modules folder, which has a common feature.

EXAMPLE 4

Example 4 is an example in which, by preparing an empty bundle for each subfolder below the individuals folder instead of changing the symbolic names of all bundles in a subfolder, and by creating a new bundle by embedding bundles in that folder into the empty bundle, collision of definition information is avoided.

In example 4, after loading each bundle in a subfolder by an independent module management infrastructure once and settling a dependency relationship between bundles, those are embedded in an empty bundle as a module which does not have bundle definition information.

A symbolic name of a subfolder name is put on the definition information on an empty bundle. In addition, only dependence of a bundle in the folder to outside (outside the subfolder) is extracted and written in dependency information. As a result, an independent bundle is created for each subfolder of the individuals folder, and thus collision of definition information on bundles which happens when loading is performed simultaneously on the module management infrastructure is avoided.

Described will be made using a specific example below.

Figure 15:
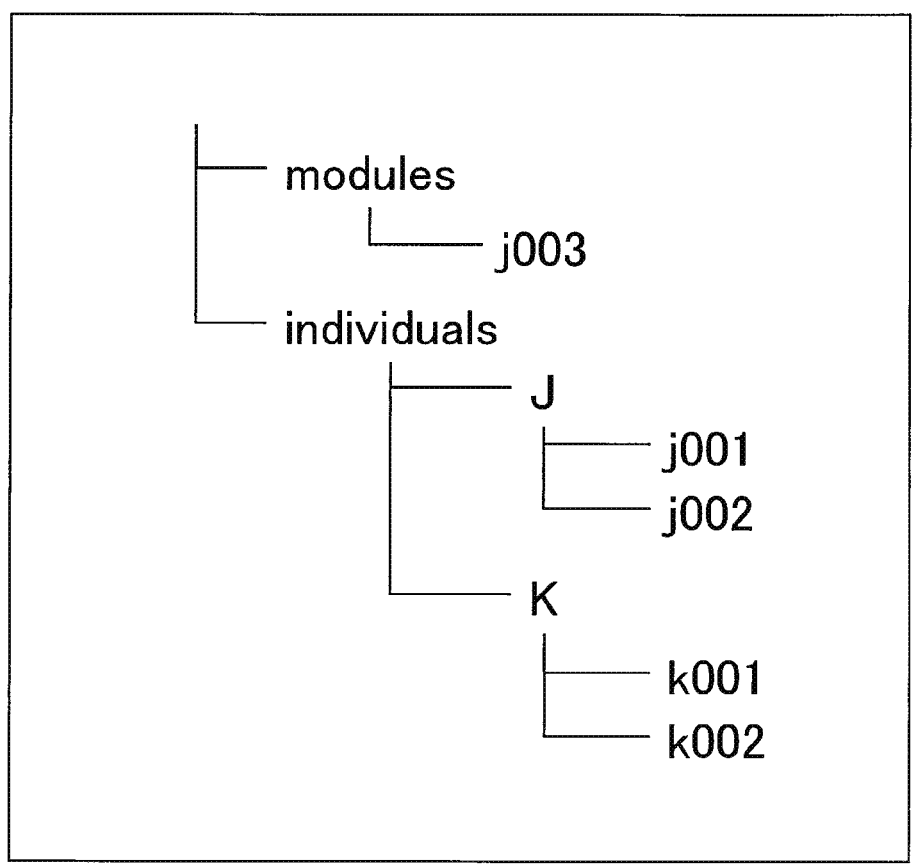
FIG. 15 is a diagram showing a folder structure according to example 4 of the present invention.
Figure 16:
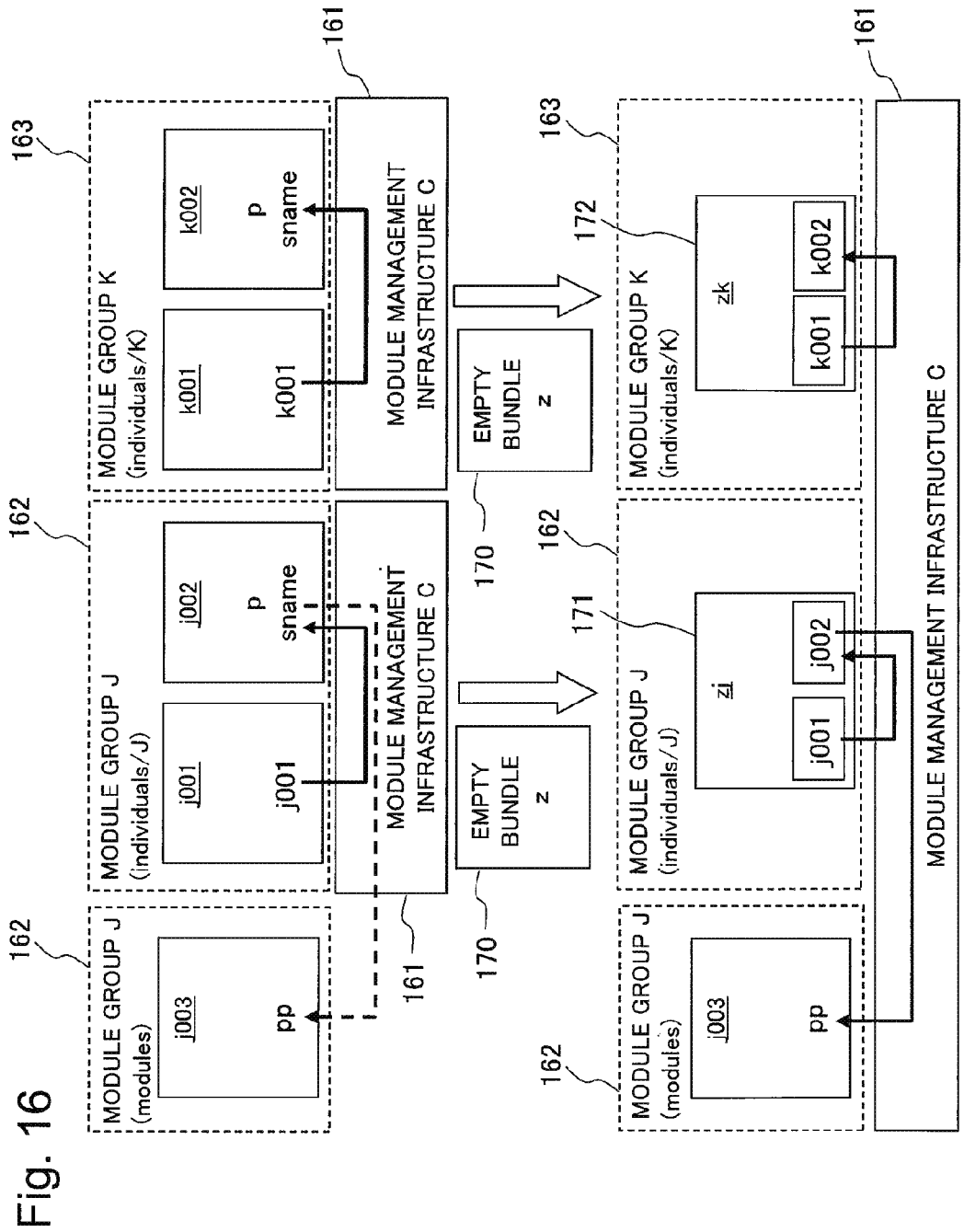
FIG. 16 is a diagram showing a state of a bundle on a module management infrastructure according to example 4 of the present invention.

A folder structure diagram of example 4 is shown in FIG. 15, and an overall block diagram is shown in FIG. 16. The upper section of FIG. 16 is a general example in which symbolic names are not changed, and the lower section is an example according to the present invention that changes symbolic names. Meanwhile, in FIG. 16, the reason why a module group J 162 is drawn in a manner being divided into two parts is to classify a difference between folders in which those bundles exist, or to classify existence or non-existence of a change in a symbolic name.

In example 4, a module group J 162 operating in a module management infrastructure J (not shown) and a module group K 163 operating in a module management infrastructure K (not shown) are made to operate in a module management infrastructure C 161.

(Structure)

The module group J 162 includes a bundle j001, a bundle j002 and a bundle j003. It is supposed that the bundle j001 depends on a package p of the bundle j002, and the bundle j002 is dependent on a package pp of the bundle j003. The bundle j002 has a symbolic name sname and the package p, and the bundle j003 has a symbolic name sname2 and the package pp. It is supposed that the bundle j003 provides a general function.

The module group K 163 includes a bundle k001 and a bundle k002, and the bundle k001 is dependent on a package p of the bundle k002. The bundle k001 has a symbolic name k001, and the bundle k002 has a symbolic name sname and a package p.

The bundle j002 and the bundle k002 have been created succeeding to the bundle x002, and have functions developed originally in addition to the common package p.

In example 4, an empty bundle z 170 is prepared. Although the empty bundle z 170 has storage portions for bundle definition information and for a module, it is supposed that both are empty.

(Operations)

Operations of a module management apparatus according to example 4 will be described using the diagram of the lower section of FIG. 16.

First, the module group J 162 and the module group K 163 are moved to the module management infrastructure C 161. In this regard, however, it is supposed that the bundle j003 is arranged in the modules folder which is a common folder because it provides a general function.

In example 4, when load processing is performed on the module management infrastructure C 161, each subfolder below the individuals folder is read by the definition changing unit 14 on a module management infrastructure C 161 that is independent once. After that, analysis of bundle information is performed, and reorganization processing of bundles is performed.

First, in load processing of the module group J 162 in an individuals/J folder, the bundle j001 and the bundle j002 are loaded, and a dependency relationship from the bundle j001 to the bundle j002 is set according to definition information on the bundles. About dependence from the bundle j002 to the bundle j003, it is supposed that only the fact that it is dependent on the bundle j003 is confirmed here, because the bundle j003 exists in the modules folder, not in the individuals/J folder.

At that time, the empty bundle z 170 is prepared. Although the empty bundle z 170 has storage portions for bundle definition information and for a module, it is supposed that those are empty at the present.

Here, as a result of reading on the module management infrastructure C 161 that is independent in the previous step, the bundle j001, the bundle j002 and a dependency relationship between those have been found. Therefore, bundle definition information is taken out from the bundle j001 and the bundle j002, and only a module part is arranged in the module storage portion of the empty bundle z 170. As a result, a dependency relationship from the bundle j001 to the bundle j002 will be settled at the time of loading by storing those in the identical bundle. Further, about dependence to the bundle j003, the description of dependency information is moved to the bundle definition portion of the empty bundle z 170.

Thus, by wrapping the module group J 162 in the empty bundle z 170, a bundle zj 171 is completed. In this regard, however, the symbolic name of the bundle zj 171 is made to be the folder name J.

The completed bundle zj 171 is moved to the module management infrastructure C 161, confirmation that collision does not occur is made by the collision detection unit 15 with reference to the bundle information table 50, and load processing is performed by the load processing unit 11.

Because the bundle zj 171 is a bundle dependent on only the bundle j003, it is added to the bundle information table 50 after storing loaded bundle information in the information storage unit 13.

After that, a dependency relationship to the bundle j003 having been loaded before by the dependence solving processing unit 12 is built, and load processing is completed. In the load processing, the bundle zj 171 composed newly is read by a class loader, and packages of a module j001 and a module j002 which are its contents are loaded.

When the modules j001 and j002 are loaded independently, one class loader is used for each of the modules, and reference is made through the module management infrastructure C 161. In contrast, in a structure integrated into one bundle like this example, reference of a package is made within one class loader.

Similarly, as for the module group K 163, a bundle zk 172 with a symbolic name K is created using the empty bundle z 170, and it is loaded on the module management infrastructure C 161.

In the bundle zj 171 and the bundle zk 172, collision of symbolic names does not occur and a false dependency relationship is not also built. Therefore, according to the present invention, load processing is completed while keeping independence of module groups below the individuals folder.

From the above mentioned examples, the features of the module management apparatus, the module management system and the module management method according to the exemplary embodiment of the present invention are summarized as following (1)-(4).

(1) In a module management infrastructure, collision of definition information on bundles can be settled without a modification of a bundle body.

(2) Building of an unexpected dependency relationship between bundles which occurs due to collision of definition information on bundles can be evaded.

(3) It is possible to avoid collision of definition information between bundles, and make a plurality of module groups with complicated dependency relationships operate concurrently.

(4) According to allocation places of bundles, they can be classified into a bundle shared with other bundles, and an individual bundle.

Thus, according to the exemplary embodiment of the present invention, it is possible to prevent forming of an unexpected dependency relationship due to collision of definition information on bundles at the time of update of an application, and realize easiness of operation, management and expansion by localizing influence of update for each module group.

That is, according to the exemplary embodiment of the present invention, it is possible to avoid collision of definition information on bundles including identical definition information, and make the both bundles operate, resulting in a plurality of module groups with complicated dependency relationships operating concurrently and independently.

Meanwhile, a management method according to the exemplary embodiment of the present invention can be applied to a program that makes a computer execute the method, and a software system, an application server and an application and the like using the program.

A module management apparatus, a module management system, a module management method and a program using the management method of the present invention can be applied to development of an application server adopting a module management infrastructure and development of a large-scale application which operates on it. For example, when a module group normally operating on another module management infrastructure is transplanted or a module is added newly in an environment that has been already built, easiness of the transition is realized. Specifically, easiness of the transition can be realized by avoiding collision of symbolic names of bundles and enabling sharing and individualization of bundles without correcting a module itself.

Although the present invention has been described in conformity with the above-mentioned exemplary embodiment and the examples above, the present invention is not limited to only the structures and operations of the above-mentioned exemplary embodiment, and it is a matter of course that the present invention includes various transformations and modifications which can be accomplished by a person skilled in the art within the scope of the present invention.

DESCRIPTION OF SYMBOLS

1 Collision avoidance device
10 Folder scanning unit
11 Load processing unit
12 Dependence solving processing unit
13 Information storage unit
14 Definition changing unit
15 Collision detection unit
21 Module management infrastructure
22 Module group A
23 Module group B
24 Bundle a
25 Bundle b
26, 29 Bundle c
27 Bundle d
28 Bundle e
50 Bundle information table 60 Symbolic name change management table
71 Module management infrastructure A
72 Module group A
73 Module management infrastructure B
74 Module group B
101, 111, 141, 161 Module management infrastructure C
113 Module group D
142 Module group E
162 Module group J
163 Module group K
170 Empty bundle z
171 Bundle zj
172 Bundle zk The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A module management apparatus, comprising:
hardware, including a processor and memory;
a folder scanning unit implemented at least by the hardware to confirm whether an unprocessed bundle exists or not by scanning a folder, in a time of start of a module management infrastructure carrying out integrated management of: a bundle having a module formed by a program described by an object oriented language and definition information including an attribute of said module; and a module group including a plurality of pieces of said bundle, upon said bundle being loaded from a folder;
a load processing unit implemented at least by the hardware to read said unprocessed bundle;
a collision detection unit implemented at least by the hardware to detect whether collision of definition information on bundles happens between an already loaded bundle and said unprocessed bundle;
a definition changing unit implemented at least by the hardware to change said definition information on said unprocessed bundle;
a dependence solving processing unit to coordinate a reference relationship between said already loaded bundle and said unprocessed bundle; and
an information storage unit implemented at least by the hardware to store information on said unprocessed bundle; and,
upon detecting collision of said definition information between said unprocessed bundle which is individualized in said folder and said already loaded bundle,
said definition changing unit changes said detected definition information of said unprocessed bundle dynamically, and
said dependence solving processing unit solves processing of a dependency relationship between said bundles.

2. The module management apparatus according to claim 1, wherein said definition information includes a symbolic name of said bundle.

3. The module management apparatus according to claim 2, further comprising: a first table including said symbolic name of said bundles and a mutual reference relationship between different ones of said bundle;
a second table including a change history of said definition information of said bundle; and
when said load processing unit loads said bundle which is shared by a whole module management infrastructure,
said collision detection unit verifies whether collision of said definition information on bundles happens between said already loaded bundle and said unprocessed bundle by referring said first table,
upon said definition information not colliding, said load processing unit read said unprocessed bundle and add information of said read bundles in said first table, and
upon said definition information colliding, said load processing unit cancel to read said unprocessed bundle, and
when said load processing unit loads said bundle which is individualized in said folder,
said definition changing unit changes said definition information of said unprocessed bundle,
said collision detection unit verifies whether collision of said definition information on bundles happen between said unprocessed bundle whose definition information is changes and said already loaded bundle by referring said first and second tables,
upon said definition information not colliding, said load processing unit read said unprocessed bundle and add information on said first and second tables, and
upon said definition information colliding, said definition changing unit change said definition information of said unprocessed bundle.

4. The module management apparatus according to claim 1, when said load processing unit loads said bundle which is shared by a whole module management infrastructure,
said collision detection unit verifies whether a first definition information on said already loaded bundle which is loaded by said load processing unit and a second definition information on said unprocessed bundle detected by said folder scanning unit collide with each other upon said first definition information and said second definition information not colliding, said load processing unite read said unprocessed bundle, and said dependence solving processing unit to coordinate a reference relationship of said bundle, and
upon said first definition information and said second definition information colliding, said load processing unit cancel to read said unprocessed bundle, and
when said load processing unit loads said bundle which is individualized in said folder,
said definition changing unit changes said second definition information to a third definition information,
said collision detection unit verifies whether said first definition information and said third definition information collide with each other,
upon said first definition information and said third definition information not colliding, said load processing unit read said unprocessed bundle, and
upon said first definition information and said third definition information colliding, said definition changing unit continue changing said third definition information to another third definition information until collision between said first definition information and said third definition not is dissolved,
said dependence solving processing unit coordinates a reference relationship between said first definition information and said third definition information after collision is dissolved, and said information storage unit updates information and a reference relationship about said third definition information.

5. The module management apparatus according to claim 4, wherein, upon said symbolic name being changed, said definition changing unit adds a symbol according to a name of said folder storing said bundle to said symbolic name.

6. The module management apparatus according to claim 1, upon loading said bundle from a common folder storing said bundle so as to make said bundle to be shared by said module management infrastructure, and from an individual folder storing said bundle so as to be individualized in said folder, said load processing unit loads said bundle from said common folder in a state enabling to be disclosed, and loads said bundle from said individual folder in a state not to be disclosed.

7. The module management apparatus according to claim 6, wherein said load processing unit loads a plurality of pieces of said bundle included in same one of said module group in a manner separating into said common folder and said individual folder.

8. The module management apparatus according to claim 1, wherein said load processing unit arranges modules included in a plurality of pieces of said bundle in an empty bundle having a blank definition information portion and a blank module storage portion while maintaining a reference relationship of said bundles, said definition changing unit gives said empty bundle said definition information not to cause collision, and said dependence solving processing unit coordinates a reference relationship of said definition information.

9. A module management method, comprising:

confirming whether an unprocessed bundle exists or not by scanning a folder, in a time of start of a module management infrastructure carrying out integrated management of: a bundle having a module formed by a program described by an object oriented language, and definition information including an attribute of said module; and a module group including a plurality of pieces of said bundle, upon said bundle being loaded from a folder;

reading said unprocessed bundle;

detecting whether collision of definition information on bundles happens between an already loaded bundle and said unprocessed bundle;

changing said definition information on said unprocessed bundle;

coordinating a reference relationship of said unprocessed bundle and said already loaded bundle;

storing information on said unprocessed bundle; and, upon detecting collision of said definition information between said unprocessed bundle which is individualized in said folder and said already loaded bundle, changing said reference relationship of said unprocessed bundle and said already loaded bundle by changing said detected definition information dynamically, and solving processing of a dependency relationship between said unprocessed bundle and said already loaded bundle.

* * * * *